United States Patent
Scheffenegger

(10) Patent No.: US 9,042,227 B2
(45) Date of Patent: May 26, 2015

(54) SYSTEMS, METHODS, AND COMPUTER PROGRAM PRODUCTS PROVIDING FEEDBACK FOR NETWORK CONGESTION MANAGEMENT

(75) Inventor: Richard M. Scheffenegger, Vienna (AT)

(73) Assignee: NetApp, Inc., Sunnyvale, CA (US)

( * ) Notice: Subject to any disclaimer, the term of this patent is extended or adjusted under 35 U.S.C. 154(b) by 363 days.

(21) Appl. No.: 13/351,372

(22) Filed: Jan. 17, 2012

(65) Prior Publication Data

US 2013/0182567 A1 Jul. 18, 2013

(51) Int. Cl.
*H04L 12/801* (2013.01)
*H04L 12/825* (2013.01)
*H04L 12/54* (2013.01)
*H04L 12/70* (2013.01)

(52) U.S. Cl.
CPC .............. *H04L 47/12* (2013.01); *H04L 12/569* (2013.01); *H04L 47/10* (2013.01); *H04L 47/00* (2013.01); *H04L 47/11* (2013.01); *H04L 47/193* (2013.01); *H04L 47/263* (2013.01)

(58) Field of Classification Search
None
See application file for complete search history.

(56) References Cited

U.S. PATENT DOCUMENTS

| | | | |
|---|---|---|---|
| 2007/0028003 A1* | 2/2007 | Rudkin | 709/241 |
| 2008/0267070 A1* | 10/2008 | Mannal et al. | 370/235 |
| 2008/0304413 A1* | 12/2008 | Briscoe et al. | 370/235 |
| 2011/0211449 A1 | 9/2011 | Attar et al. | |

FOREIGN PATENT DOCUMENTS

WO WO2011098052 A1 * 8/2011

OTHER PUBLICATIONS

Kuehledwind et al., "Accurate ECN Feedback in TCP", Jul. 4, 2011, IETF.*
Kuehledwind et al., "Accurate ECN Feedback in TCP", Dec. 21, 2011, IETF.*
Kuehledwind et al., "Accurate ECN Feedback in TCP", Nov. 16, 2011, TCPM-82. IETF Taipei.*
M. Alizadeh, A. Greenberg, D. Maltz, J. Padhye, P. Patel, B. Prabhakar, S. Sengupta, and M. Sridharan, "Data Center TCP (DCTCP)", Jan. 2010, 12 pages.
M. Alizadeh, A. Greenberg, D. Maltz, J. Padhye, P. Patel, B. Prabhakar, S. Sengupta, and M. Sridharan, "DCTCP: Efficient Packet Transport for the Commoditized Data Center", Jan. 2010, 15 pages.

(Continued)

*Primary Examiner* — Ayaz Sheikh
*Assistant Examiner* — Peter Chau
(74) *Attorney, Agent, or Firm* — Haynes and Boone, LLP

(57) ABSTRACT

A computer program product having a computer readable medium tangibly recording computer program logic for providing feedback in a network, the computer program product including code to receive first data and second data over the network at a receiving device, code to increment a first counter and a second counter in response to the first data and second data, respectively, code to generate a plurality of feedback signals reflecting states of the first and second counters using at least three bits, the bits defining a set of code points mapped to the states of the first and second counters so that each individual code point represents a different one of the states and each one of the states is represented by one code point, and code to transmit the plurality of feedback signals to a sending device in the network.

20 Claims, 7 Drawing Sheets

(56) References Cited

OTHER PUBLICATIONS

B. Briscoe, A. Jacquet, T. Moncaster, and A. Smith, "Re-ECN: Adding Accountability for Causing Congestion to TCP/IP", draft-briscoe-tsvwg-re-ecn-tcp-09 (work in progress), Oct. 2010, 51 pages.

M. Kühlewind and R. Scheffenegger, "TCP Modifications for Congestion Exposure", ConEx—81. IETF Quebec, Jul. 27, 2011, pp. 1-17.

M. Kuehlewind and R. Scheffenegger, "Accurate ECN Feedback in TCP draft-kuehlewind-conex-accurate-ecn-01" (work in progress), Oct. 31, 2011, 23 pages.

M. Alizadeh, A. Javanmard, B. Prabhakar, "Analysis of DCTCP: Stability, Convergence, and Fairness", 14 pages.

B. Briscoe, A. Jacquet, T. Moncaster, and A. Smith, "Re-ECN: A Framework for Adding Congestion Accountability to TCP/IP", draft-briscoe-tsvwg-re-ecn-tcp-09 (work in progress), Oct. 2010, 41 pages.

* cited by examiner

Fig. 9  TABLE 1

| NS | CWR | ECE | CI (BASE 5) | E1 (BASE 3) |
|---|---|---|---|---|
| 0 | 0 | 0 | 0 | - |
| 0 | 0 | 1 | 1 | - |
| 0 | 1 | 0 | 2 | - |
| 0 | 1 | 1 | 3 | - |
| 1 | 0 | 0 | 4 | - |
| 1 | 0 | 1 | - | 0 |
| 1 | 1 | 0 | - | 1 |
| 1 | 1 | 1 | - | 2 |

— FIVE CONGESTION COUNTER VALUES

— THREE HONESTY ACCOUNTING COUNTER VALUES

NS, CWR, AND ECE FORM A THREE-BIT FIELD IN ACK MESSAGES THAT CAN BE USED TO CONVEY EIGHT CODE POINTS

SYSTEMS, METHODS, AND COMPUTER PROGRAM PRODUCTS PROVIDING FEEDBACK FOR NETWORK CONGESTION MANAGEMENT

TECHNICAL FIELD

The present description relates, in general, to network feedback signaling and, more specifically, to techniques using code points provided by a set of bits to present network feedback signaling.

BACKGROUND

Communication networks are often bandwidth-limited. Thus, data sent from a sender to a receiver in a given communication network may experience delay (or may even be lost) as a link between the sender and receiver reaches its maximum throughput capability. This is true for Local Area Networks (LANs), the public Internet, cloud computing/storage networks, and the like. For instance, in a network storage environment, the data sent over a network link to a storage device at a data center or data sent over a network link from a storage device to a host is subject to maximum throughput limits and may experience deleterious effects as maximum throughput is reached. Heavy use of a network that may lead to delay and packet loss may be referred to in this example as network congestion.

Some conventional solutions provide for congestion signaling, wherein a receiver that is made aware of congestion in the network (either by detecting congestion itself or being informed of the congestion by a network device) sends feedback to the sender to make the sender aware of the network congestion. When the sender receives the feedback that indicates congestion, the sender may, e.g., reduce its sending bit rate to alleviate the congestion in the network. In many deployed systems, a single sender may have simultaneous sessions with a multitude of receivers, and the sender may adjust a bit rate for some, all, or none of the sessions as appropriate. However, some less honest users of the network may program a receiver not to report congestion, thereby reducing the probability that a sender will adjust a bit rate of a session with that receiver. Such dishonest action may increase the burden on the other receivers to alleviate the network congestion. The following discussion provides examples of conventional attempts to provide accurate congestion feedback as well as to provide a check for honesty of a receiver.

Explicit Congestion Notification (ECN) is defined in the Internet Engineering Task Force (IETF) standard given in Request For Comments (RFC)3186 (where "RFC" is an indication used by some standards bodies identifying a document that describes a technical standard). Two bits, defining four code points, are placed in an Internet Protocol (IP) header. Code point 00 indicates that a device is not ECN capable; 01 and 10 both indicate that a device is ECN capable; and 11 is an indication that congestion is being experienced.

For instance, if a router in a network experiences congestion, the router may insert a 11 into an IP header in a packet destined for a receiver. The receiver detects the congestion indication and sends a feedback packet (e.g., a Transmission Control Protocol (TCP) packet) further indicating the congestion. RFC3186 defines a "ECE" flag in the TCP transport header, and the receiver may use the flag to indicate the congestion state in the network. Upon receipt of the feedback message, the sender may take some action to alleviate the congestion, such as by reducing a bit rate. The sender may also set a Congestion Window Reduced (CWR) flag in an IP packet to indicate to the receiver to stop marking the congestion flag in the feedback packets. Conventional ECN provides only a single value for congestion, limiting its information value.

ECN Nonce (RFC3540) was proposed as an enhancement to conventional ECN. ECN Nonce includes the concept of receiver honesty to prevent a scenario wherein a receiver deliberately suppresses congestion feedback in order to gain higher bandwidth over other sessions in the network. In ECN Nonce, the sender sends a signal "ECT1" to increase a counter at the receiver side. The receiver constantly announces the current value of this counter using the one-bit NS flag in the TCP transport header. The sender checks if the counter value (NS bit) plus the ECE bit in the TCP transport header are same or higher than the count of the sent ECT1 code points. If the received counter is less than the expected value, either the path or the receiver is misbehaving (e.g., not properly supporting ECN or deliberately suppressing congestion feedback to the sender). Otherwise, it is assumed that the path and the receiver are supporting ECN Nonce. It is worth noting that after the receiver receives a congestion indication or after a message loss, the receiver can not know the correct value of the Nonce sum. If this event is not concealed by the receiver, the sender synchronizes to the receiver value. Otherwise, the sender may reset the session.

In another proposed enhancement, called Data Center TCP (DCTCP) by Microsoft Corporation, a congestion code point change in the IP header causes the receiver to immediately trigger an ACK to feedback congestion information. The proposal is compatible with ECN Nonce and does away with the CWR flag. Some drawbacks of DCTCP include that lost ACKs result in loss of congestion information and also that the system may trigger an ACK for every data segment. Another proposal from M. Kuhlewind builds upon DCTCP to use the CWR flag as a shift bit for the last congestion state to protect against a single ACK loss. However, two or more lost ACKs may cause loss of congestion information.

Another proposal called re-ECN by British Telecom uses three bits (NS, CWR, ECE) in the TCP transport header as single field (ECI). ECI is used to signal the current value of the receiver side congestion counter. Such proposal protects against at least two consecutive ACK losses (since it uses three bits), and it provides a higher level of detail about a congestion level of the network. However, such proposal is incompatible with ECN Nonce because it uses all three bits (NS, CWR, ECE) for congestion indication, leaving none for honesty accounting. Thus, a sender cannot tell an honest receiver from a dishonest receiver as with the ECN Nonce technique. There is currently no solution available that provides a higher level of detail about a level of congestion while also being compatible with ECN Nonce or other honesty accounting information.

BRIEF DESCRIPTION OF THE DRAWINGS

The present disclosure is best understood from the following detailed description when read with the accompanying figures.

FIG. 9 is an illustration of an example relationship between a set of code points and two counters, adapted according to one embodiment.

SUMMARY

Figure 1:
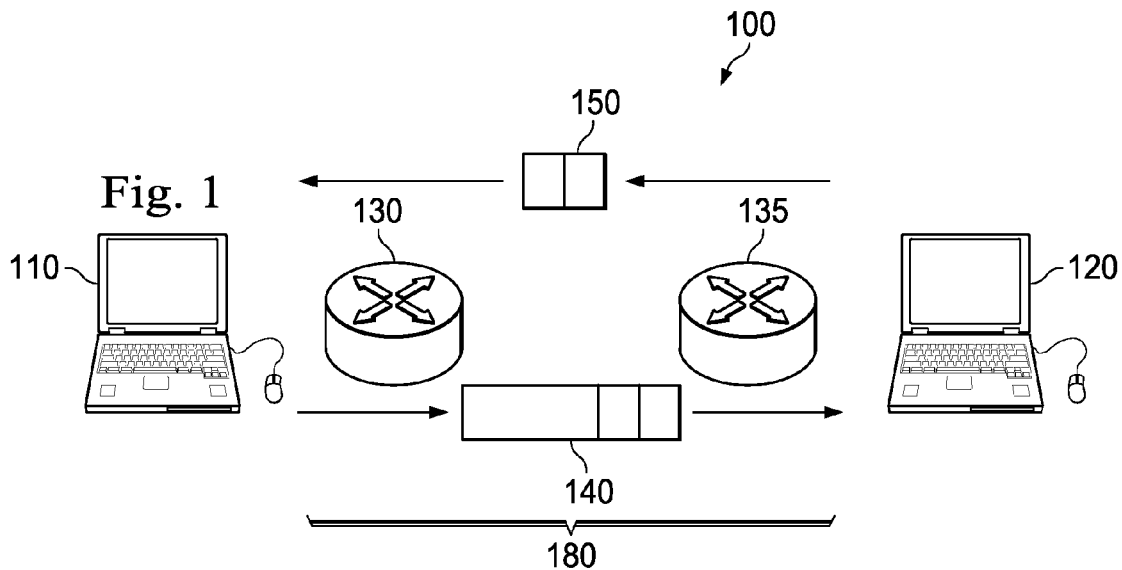
FIG. 1 is an illustration of an example system in which various embodiments may be implemented.

Various embodiments include systems, methods, and computer program products providing network feedback. In one example, an embodiment includes managing network congestion using feedback signals, where the feedback signals include code points representing congestion information and honesty accounting information.

One of the broader forms of the present disclosure involves a computer program product having a computer readable medium tangibly recording computer program logic for providing feedback in a network, the computer program product including code to receive first data and second data over the network at a receiving device, code to increment a first counter and a second counter in response to the first data and second data, respectively, code to generate a plurality of feedback signals reflecting states of the first and second counters using at least three bits, the bits defining a set of code points mapped to the states of the first and second counters so that each individual code point represents a different one of the states and each one of the states is represented by one code point, and code to transmit the plurality of feedback signals to a sending device in the network.

Another of the broader forms of the present disclosure involves a method includes receiving network congestion information at a receiver over a computer network, receiving honesty counter adjustment indications from a sender over the network, where the receiver is in a feedback loop with the sender in the network, incrementing a first counter based on the congestion information, incrementing a second counter based on the honesty counter adjustment indications, constructing a plurality of feedback response messages, each of the feedback response messages including information regarding the first or the second counter using one of N code points, N being an integer, where some of the N code points refer to information associated with the first counter and others of the N code points refer to information associated with the second counter, the N code points being defined using a common set of at least three bits in the plurality of feedback response messages, and sending the feedback messages to the sender over the computer network.

Another of the broader forms of the present disclosure involves a receiver in a network environment includes at least one port for communicating over a computer network, in which the receiver is in a feedback loop with a sender over the network, a first counter for storing network congestion information, a second counter for storing honesty accounting information, a processor for incrementing the first and second counters and for forming feedback messages based on the first and second counters, further in which each feedback message includes a common set of M bits defining one of N different code points, where M and N are both integers larger than one, where a first set of the N code points represents the network congestion information and where a second set of the N code points represents the honesty accounting information, and a transmission unit for sending the feedback messages over the network to the sender.

Another of the broader forms of the present disclosure involves a method performed by a sending device in a feedback loop with a receiving device over a computer network, the method including receiving feedback messages from the receiving device, the feedback messages carrying information indicating a state of a first counter at the receiving device and a state of a second counter at the receiving device, where each one of the feedback messages has at least three bits defining one of N code points, a first set of the code points mapped to the state of the first counter and a second set of the code points mapped to the state of the second counter, incrementing third and fourth counters at the sending device in response to the received feedback messages, the third and fourth counters corresponding to the first and second counters, respectively, and managing a network behavior of the sending device in response to incrementing the third and fourth counters.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It is understood that various embodiments may be implemented in any kind of network environment. For example, some embodiments may be implemented in a TCP/IP network connecting multiple clients and multiple servers. Other embodiments may be implemented in more specialized environments, such as in a Network Attached Storage (NAS), a Storage Area Network (SAN), or any other network storage configuration. Various embodiments are not limited to any particular network architecture or purpose and may be adapted for use in a wide-ranging array of environments.

Various embodiments disclosed herein provide a receiver in a network feedback loop with a sender. One example includes a sender that sends streaming media to the receiver. In yet another example, a sender is a device writing large amounts of data to a storage server (and the storage server is the receiver). Routers and/or switches in the network between the sender and the receiver detect congestion. Such routers and switches mark packets with a congestion flag when congestion is detected. The receiver increments a counter when it receives packets marked with the congestion flag. An example of a counter is a register maintained by a processor at the receiver. The counter includes multiple bits, and it uses those bits to store a value. The processor can increment or decrement the value at the counter as appropriate—in this example the processor increments the value in the counter upon receiving a packet from a router marked with a congestion indication.

The receiver sends feedback packets that include information that reflects the state of its congestion counter. A state of the counter, in this example, refers to the number stored in the counter at a given time. The state of the counter may change over time, depending on congestion in the network.

Furthermore, the sender periodically sends indications for the receiver to update its honesty counter, similar to ECN Nonce. The receiver, if it is operating honestly, updates its honesty counter accordingly and, when appropriate, sends feedback to the sender. The feedback indicates a value (or state) of the receiver's honesty counter. As explained in more detail below, the sender can examine this feedback to discern whether the receiver is behaving honestly.

In contrast to some conventional approaches described in the background, the receiver includes enhanced functionality to allow it to send both congestion information and honesty accounting information to the sender using the feedback loop. The receiver uses a number of bits M in a feedback packet header to represent the congestion information and the honesty accounting information. For instance, if M is three, then three bits provide eight total code points (i.e., $2^3$=8), which are values that can be represented by the bits. A subset of the code points can be devoted to the congestion information, whereas another subset of the code points can be devoted to the honesty accounting information. See Table 1 below for an example configuration.

While it is possible that some embodiments might theoretically define a particular code point to represent an honesty accounting value and a congestion value, most embodiments will define a particular code point as an honesty accounting value or a congestion value. Thus, many embodiments include feedback packets, where each individual packet may carry one of the code points to represent an honesty accounting value or a network congestion value, but not both. Nevertheless, a common set of M bits can provide a sufficient number of code points to represent the honesty accounting values and the network congestion values.

Furthermore, some embodiments use a value of M that is large enough to provide three or more code points for each type of information, thereby providing a higher informational content than a simple zero or one. For instance, when M is three, one example devotes five code points to congestion information and three code points to honesty information. However, the scope of embodiments is not limited to any particular value of M, and the scope of embodiments can include any appropriate value for M three or larger. Further, the number of code points devoted to a type of information is not limited to the examples above, as any appropriate number of code points two or larger may be devoted to a particular type of information. The number of code points provides for a high level of information in the feedback and also provides resiliency when one or more feedback packets are lost.

FIG. 1 is an illustration of an example system 100 in which various embodiments may be implemented. Sender 110 is coupled to receiver 120 through a network 180. The network 180 may include, for example, a local area network (LAN), wide area network (WAN), the Internet, a Fibre Channel fabric, or any combination of such interconnects. Each of the sender 110 and receiver 120 may include, for example, a personal computer (PC), server computer, storage server, workstation, handheld computing/communication device or tablet, and/or the like. FIG. 1 shows only two computing components 110, 120, but the scope of embodiments can include any appropriate number of senders and/or receivers. Moreover, FIG. 1 shows two routers 130, 135 for illustration only, and it is understood that in various embodiments network 180 may include any appropriate number of routers and switches.

As mentioned above, the receiver 120 includes enhanced functionality to keep track of, and convey, honesty accounting information and network congestion information. Receiver 120 acquires honesty counter information and congestion information via IP packets 140 and updates its counters appropriately. Receiver 120 provides feedback as packets 150 (e.g., TCP ACK packets). Sender 110 also includes enhanced functionality to keep track of the feedback from receiver 120 and to react accordingly. Sender 110 and receiver 120 both include computer readable code, which when executed, causes sender 110 or receiver 120, respectively, to perform according to the signal diagram of FIGS. 2-7. In other words, for any of the actions described below, the sender 110 or the receiver 120 may be pre-programmed to take such actions. Furthermore, in many embodiments, the various values (e.g., number of code points, size of counters, thresholds, etc.) are pre-determined and programmed to the sender 110 and/or receiver 120.

Figure 2:
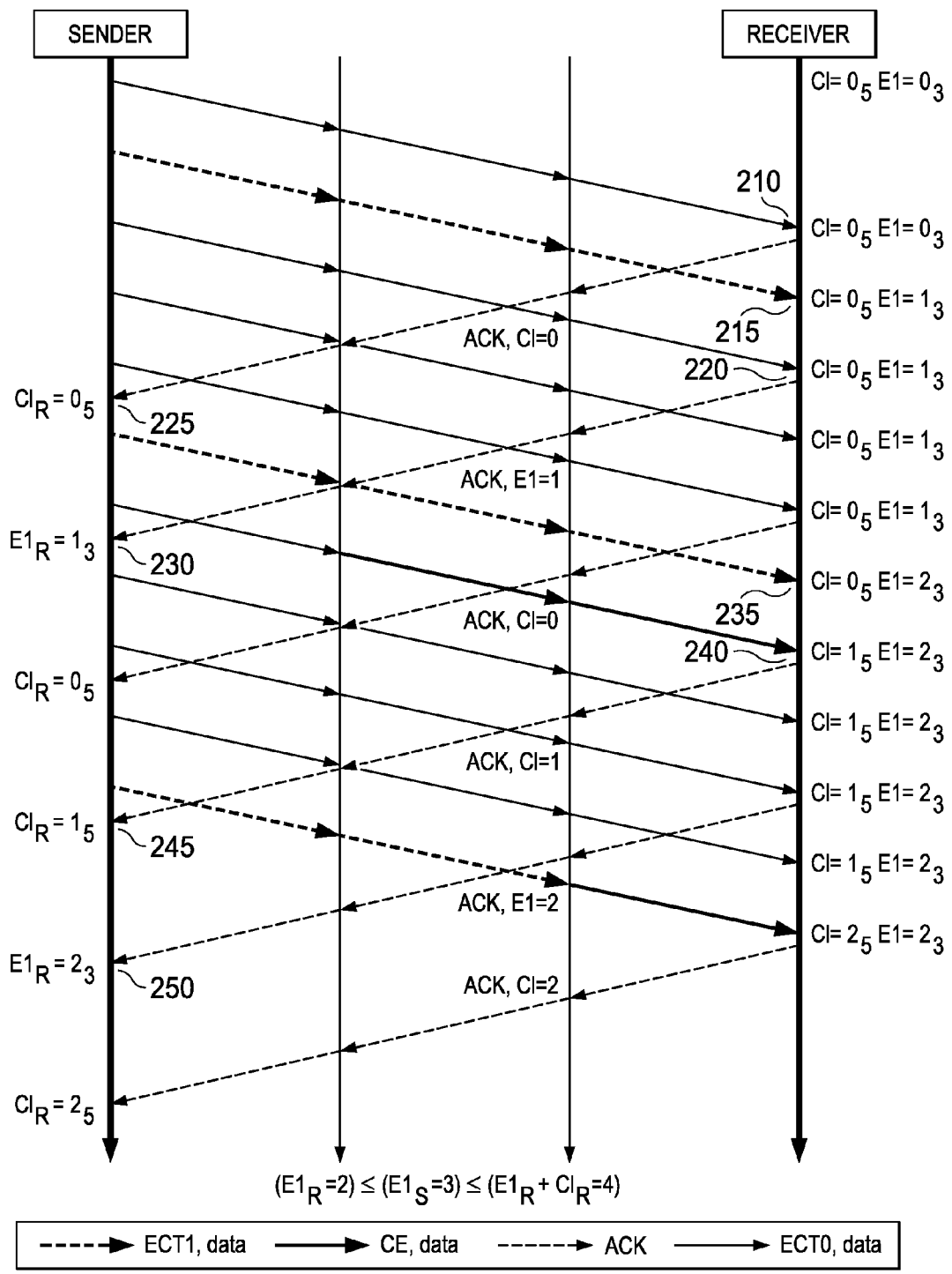
FIG. 2 is a signal diagram illustrating a process for providing appropriate feedback in the example system of FIG. 1 according to one embodiment.

FIG. 2 is a signal diagram illustrating a process for providing appropriate feedback in the system 100 of FIG. 1. On the right side, the values in the receiver's two counters are shown. On the left side, the values in the sender's complementary counters are shown. The legend provides a description of the particular signals between the sender and the receiver.

The receiver maintains two counters to count CE marks (congestion flags from a network router/switch) and ECT1 marks (flags from the sender to indicate that the honesty counter should be incremented) of the received IP packets. In this example, the "CI" counter is a congestion counter at the receiver, and the "E1" counter is the honesty accounting counter at the receiver. The sender includes complementary counters. The feedback from the receiver causes the sender to update its complementary counters. Using these sender-side counters, the sender can perform more informed congestion control decisions (such as in DCTCP) or IP-level signaling (such as in re-ECN), and detect misbehaving receivers (such as in ECN Nonce).

The present embodiment utilizes the three TCP ECN flags as a single field. The three bits of this field provide eight different states (one for each code point). Each of the code points of this field are given a distinctively different meaning. Example code point values are provided in Table 1 (below), and the scope of embodiments is not limited thereto. FIG. 9 is provided to illustrate the various relationships of the values in Table 1.

TABLE 1

| NS | CWR | ECE | CI (base 5) | E1 (base 3) |
|----|-----|-----|-------------|-------------|
| 0  | 0   | 0   | 0           | —           |
| 0  | 0   | 1   | 1           | —           |
| 0  | 1   | 0   | 2           | —           |
| 0  | 1   | 1   | 3           | —           |
| 1  | 0   | 0   | 4           | —           |
| 1  | 0   | 1   | —           | 0           |
| 1  | 1   | 0   | —           | 1           |
| 1  | 1   | 1   | —           | 2           |

In Table 1, the eight code points are the eight binary values (000, 001, . . . 111). Each code point indicates a number in one of the counters. For example, the code point 011 conveys congestion information because it corresponds to a value of 3 at the CI counter. Similarly, the code point 110 conveys honesty accounting information because it corresponds to a value of 1 at the E1 counter.

Where three bits are used, as in Table 1, the exact assignment of code points may be different in other embodiments. For instance, the five Congestion Indication (CI) code points and the three ECN-Capable Transport 1 (ECT1—or E1 for short) code points may be arbitrarily mapped to any of the eight available values. Also, different distributions, such as six code points for CI, and two for E1, or four/four may be used in some embodiments. Similarly, different embodiments may use a number of bits higher than three. Such features may be pre-programmed into a sender and/or a receiver.

The counters themselves may be implemented as modulo five and modulo three, respectively. The modulo operation refers a maximum number of values that can be incremented before the counter rolls over (wraps). Since five code points are devoted to congestion information in this example, it may be appropriate to use a modulo five counter for the CI counter. Similarly, the E1 counter is implemented as a modulo three counter. Only the last digit of a base-5 (CI) or base-3 (E1) counter is conveyed—these counters wrap at a multiple of five or three, respectively. In some embodiments, a modulo operation is used to convert a regular binary counter into a base5 or base3 last digit. Also, if a different number of code points is assigned, the modulo operation can be adjusted accordingly.

In FIG. 2 the receiver sends ACKs back to the sender, and in this example, the receiver provides an ACK feedback for every two IP packets received. Each ACK normally carries the appropriate code point to signal the state of the CI counter. When the receiver receives an ECT1 flag in the IP header, the receiver will send the appropriate code point of the E1 counter in the next ACK. If both the E1 and CI counters change in one interval, priority is given to the CI counter so that the next ACK will carry the code point for the updated CI counter, while information conveying the code point for the E1 counter may be delayed until a subsequent ACK is sent.

It might be possible that a difference between a counter and the last signaled code point becomes quite large. In such a case, the receiver may send an ACK immediately, even if an ACK was sent in response to the immediately preceding IP packet. Such feature is described in more detail below with respect to FIG. 5. A pre-determined threshold for such difference may be programmed as appropriate for a given application at a receiver.

In FIG. 2 the initial states of the E1 and CI counters at the receiver and at the sender are all zero. At time point 210, the receiver receives a ECT0 signal and does not change the value of any counter in response thereto. The receiver then sends an ACK packet to the sender, where the ACK carries a code point indicating that the CI counter is at zero. At time point 225, the sender receives the ACK packet.

The next IP packet has an ECT1 flag and is received at time point 215 causing the receiver to update its E1 counter to a value of one. In this example, the receiver does not send an ACK packet for every IP packet and, thus, waits until time point 220 to send the ACK packet reporting a change in the E1 counter. The sender receives the ACK packet at time point 230 and updates its corresponding counter appropriately.

At time point 235, the receiver receives another ECT1 flag from the sender and updates its E1 counter. However, it is not time to send an ACK at time point 235. At time point 240, the receiver receives a congestion indication and updates its CI counter. The receiver then sends an ACK packet that carries a code point for the CI, rather than for the E1 counter, because in this example the CI counter takes priority. Thus, the sender does not update its complementary honesty counter until time point 250, whereas the sender updates its complementary congestion counter at time point 245.

The example of FIG. 2 shows a scenario where congestion is light, no ACK packets are lost, and the receiver acts honestly. The sender maintains a counter of the number of sent packets with ECT1 ($E1_S$). A comparison with the received E1 counter ($E1_R$) and the received CI counter ($CI_R$) reveals if a receiver is operating correctly: $E1_R \leq E1_S \leq (E1_R + CI_R)$. The exchange may go on indefinitely, and the sender should at any time be able to verify the operation of the network and the receiver. If the sender determines at any time that the receiver or network is not behaving properly, the sender may take appropriate action by, e.g., ending or resetting the session. The sender may also react to congestion information in any appropriate manner. For instance, as the receiver's CI counter increments up, the sender may become aware of this issue by analyzing the receiver's feedback. The sender may then adjust a bit rate of the session (or of another session), end the session, or take other appropriate action to alleviate the congestion.

Figure 3:
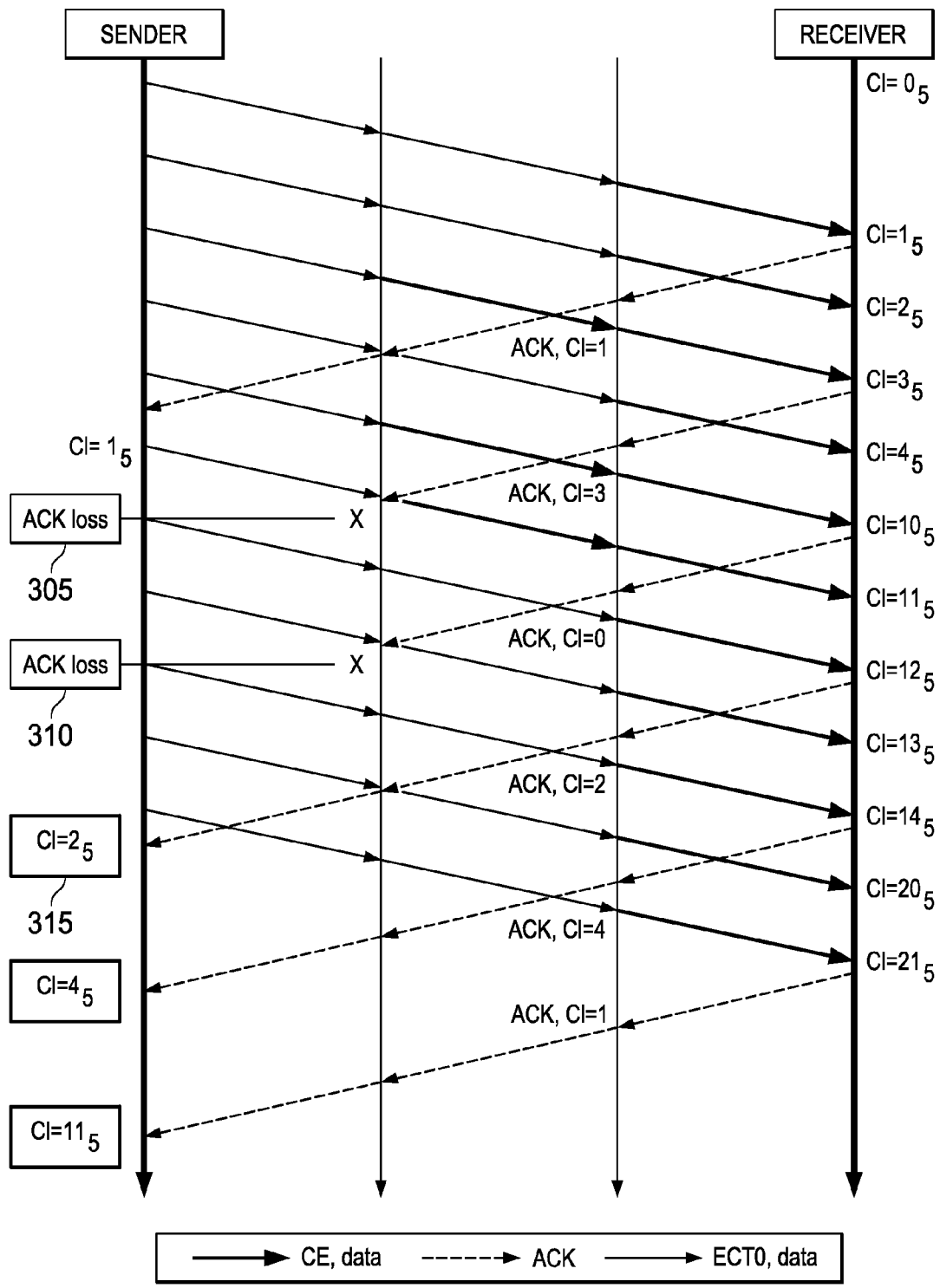
FIG. 3 is a signal diagram illustrating network congestion in the example system of FIG. 1 according to one embodiment.

However, in a different scenario where the congestion is heavy, the sender may have more difficulty determining the state of either of the receiver's counters. FIG. 3 shows a scenario according to one embodiment wherein network congestion is very heavy, so that each one of the IP packets shows congestion and causes the receiver to increment its CI counter. Furthermore, ACKs are lost at time points 305, 310, which is a likely event when congestion is heavy. As a result, the CI counter at the receiver rolls over (or wraps) once without the sender being aware. Therefore, at time point 315, the sender may assume that the CI counter value is decimal two (zero-two in Base 5), whereas the CI counter value has rolled over and really should reflect a value of decimal six (one-two when counting in Base 5).

Various embodiments include one or more features to address the issue illustrated in FIG. 3. One example feature includes sending each code point twice. Such feature allows for up to two consecutive ACKs to be lost, in some instances, without any impact of the feedback signal. If both counters change simultaneously, the respective code points are sent alternatively to allow at least three consecutive ACK losses.

Figure 4:
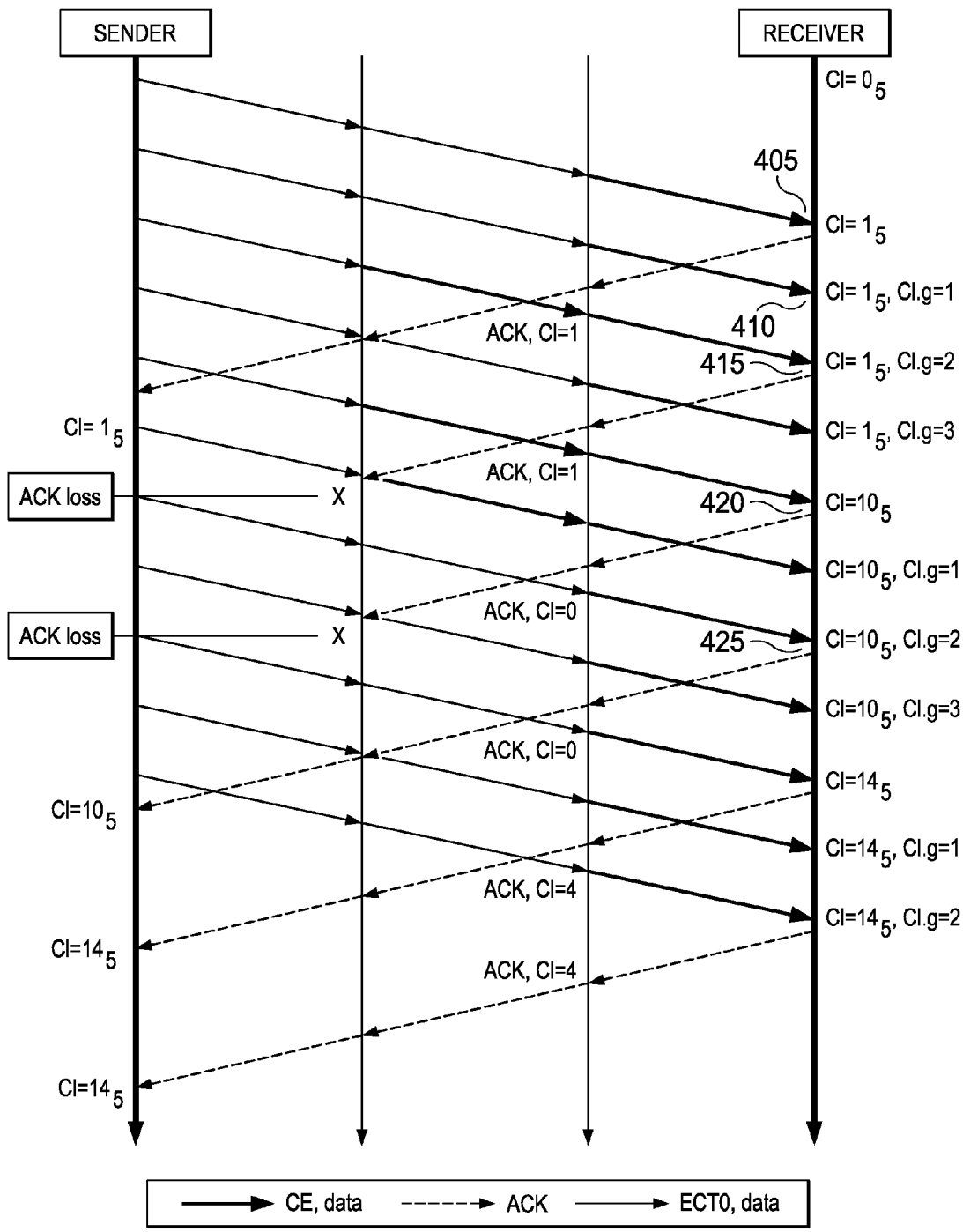
FIG. 4 is a signal diagram illustrating a process for providing appropriate feedback in the example system of FIG. 1 according to one embodiment.

FIG. 4 illustrates such a scenario according to one embodiment. In FIG. 4, the network is very congested, and every IP packet at the receiver indicates congestion. At time point 405, the receiver sends an ACK indicating a Cl counter value of decimal 1, and the receiver repeats the same counter value at time point 415, even though another IP packet indicating congestion is received at time point 410. The receiver sends a subsequent ACK at time point 420, and this ACK indicates the last counter digit being zero, indicating decimal 5 (one-zero in Base 5). The ACK at time point 425 also indicates a Cl last digit value of zero because each counter value is sent twice.

It is noted that the ACKs sent at time points 415 and 420 are both lost before they reach the sender. However, the sender is able to discern the value of the counter because it did receive the ACKs sent at time points 405 and 425, which are identical to the ACKs sent at time points 415 and 420, respectively. It is also noted that the resiliency illustrated in FIG. 4 is due to the fact that the two lost ACKs happen to straddle a change in the reported Cl value. As an illustration, suppose the ACKs sent at time points 420, 425 had been lost instead. In such a scenario, the sender would have missed both ACKs reporting a Cl value of zero, and the sender might not be able to discern the correct value of the Cl counter at the receiver. Thus, the feature illustrated in FIG. 4 may add resiliency, but it may not be comprehensive.

FIG. 4 also shows the use of a counter CI.g. Since the space for communicating the information back to the sender in ACKs is limited, instead of directly increasing this counter, a "gauge" (CI.g) is increased instead. When sending an ACK, the content of this gauge (capped by the maximum number that can be encoded in the ACK, e.g. 4 for CI, and 2 for E1) is copied to the actual counter, and CI.g is reduced by the value that was copied over and transmitted (unless CI.g was zero before).

To avoid losing information, the receiver sends an ACK at least after five incoming congestion marks (i.e. when CI.g exceeds five). For resilience against lost ACKs, an indicator flag (CI.i) ensures that, whether another congestion indication arrives or not, a second ACK transmits the previous counter value again. The same counter/gauge method is used to count and feed back (using a different mapping) the number of incoming packets marked ECT(1) (called E1 in the algorithm). As fewer code points are available for conveying the E1 counter value, an immediate ACK may be triggered whenever the gauge E1.g exceeds a threshold of 3. The sender receives the receiver's counter values and compares them with the locally maintained counter. Any increase of these counters is added to the sender's internal counters, yielding a precise number of CE-marked and ECT(1) marked packets. Architecturally the counters do not decrease during a TCP session. However, any overflow may be modulo 5 for CI and modulo 3 for E1.

The feature illustrated with respect to FIG. 4 is not limited to the exact configuration described wherein each code point is sent twice. Various embodiments may repeat a congestion value or an honesty accounting value more than twice if appropriate. However, as M increases, the benefit of such repetition decreases.

Figure 5:
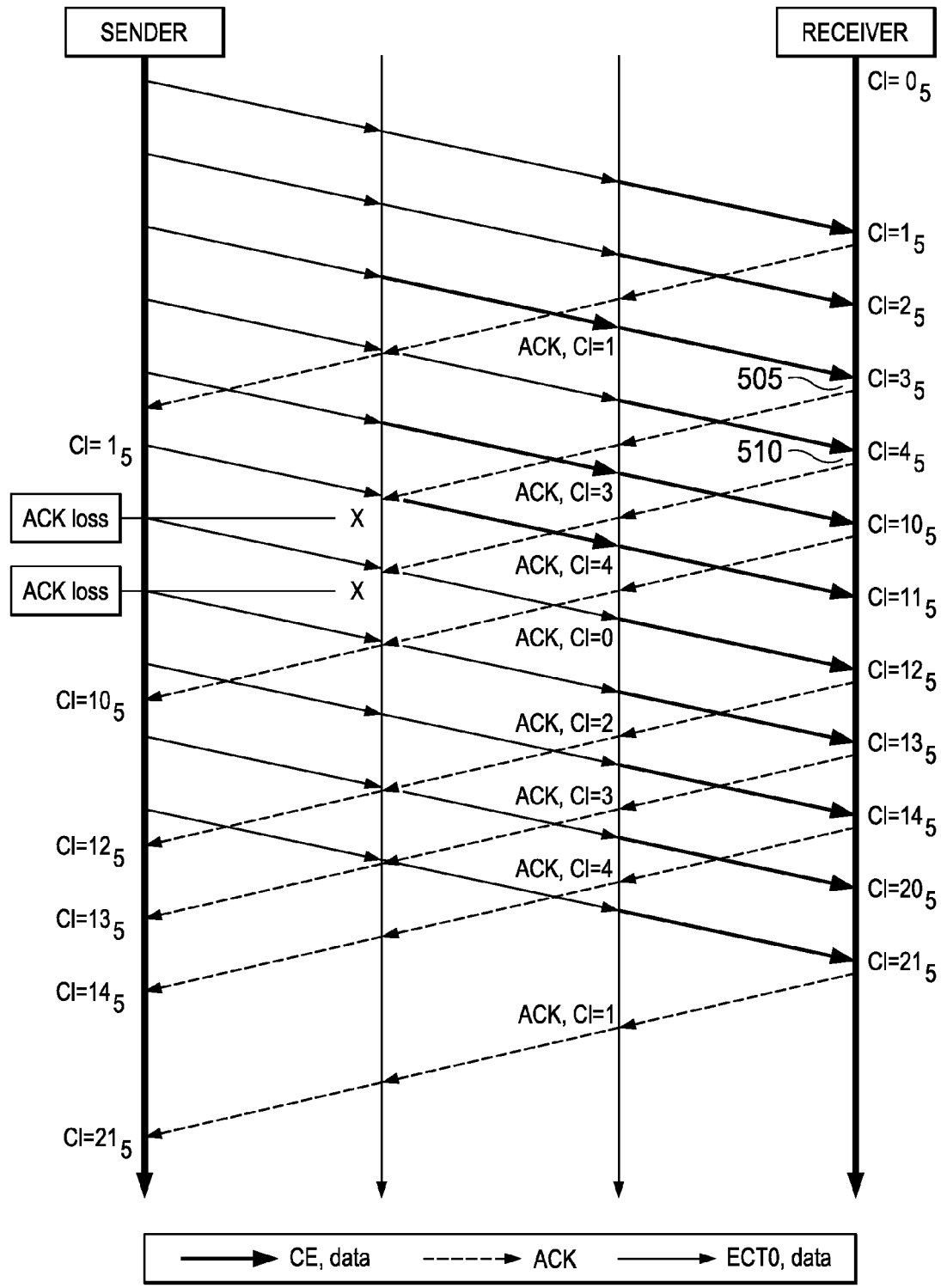
FIG. 5 is a signal diagram illustrating a process for providing appropriate feedback in the example system of FIG. 1 according to one embodiment.

Another example feature is illustrated in FIG. 5 according to one embodiment. In this example, the receiver limits the maximum difference in the signaled code points for a few preceding ACKs. When the maximum difference between the preceding ACK and the corresponding counter reaches the maximum difference, the receiver may send an ACK, even if it would otherwise be premature. In other words, FIG. 5 illustrates an embodiment that increases a sending rate for feedback as appropriate. The difference should not be larger than the number of code points for a particular type of reported information. The maximum difference may be manifest as one or more pre-determined thresholds (e.g., Relations 1 and 2, below) that are programmed into the receiver.

Assuming that (t) represents the current time point, and (t-1), (t-2) and (t-3) represent time points of the three preceding ACKs, then one embodiment operates according to Relations 1 and 2, given below, wherein when either relation is untrue, the receiver triggers an ACK at time point (t).

$$CI_{t-1} > CI_{t-2} + 2 \; [(\# \text{ code points } N-1)/2] \quad (1)$$

$$CI_{t-1} >= CI_{t-3} + 4 \; [(\# \text{ code points } N-1)] \quad (2)$$

In FIG. 5, the network is experiencing heavy congestion, and every IP packet received by the receiver indicates congestion. Ordinarily the receiver would send an ACK for every other IP packet, but in this example, the receiver operates according to Relations 1 and 2 (above). Assuming that the number of CI code points is five, as in the previous examples, then Relation 1 becomes untrue at time point 510. Thus, the receiver sends an ACK at time point 510, even though the ACK would otherwise be premature.

Further in the example of FIG. 5, the ACKs sent at time points 505 and 510 are lost before they reach the receiver. However, Relations 1 and 2 are formulated so that any two consecutive ACKs (but not more than two) can be lost, and the sender will still be able to accurately know the state of the counter at the receiver. In other words, in the example of FIG. 5, Relations 1 and 2 ensure that enough ACKs are sent so that a counter at the receiver will not roll over more than once for each three ACKs sent.

One disadvantage of the embodiment described with respect to FIG. 5 is that such embodiment may increase the number of ACKs sent in the feedback loop, which may actually increase congestion. However, the added resiliency may outweigh that disadvantage for some applications.

While the example of FIG. 5 is shown with respect to the congestion counter only, it is noted that the scope of embodiments may include a similar feature for the honesty accounting counter as well. Furthermore, in embodiments where M is larger than 3 and/or where greater resiliency is desired, Relations 1 and 2 may be changed accordingly. The embodiments described with respect to FIGS. 4 and 5 are optional and may be implemented in some cases with no further sender side changes. Such embodiments may be especially applicable to specific environments with potential extreme congestion, such as data centers, virtual distributed data centers, and the like.

Figure 6:
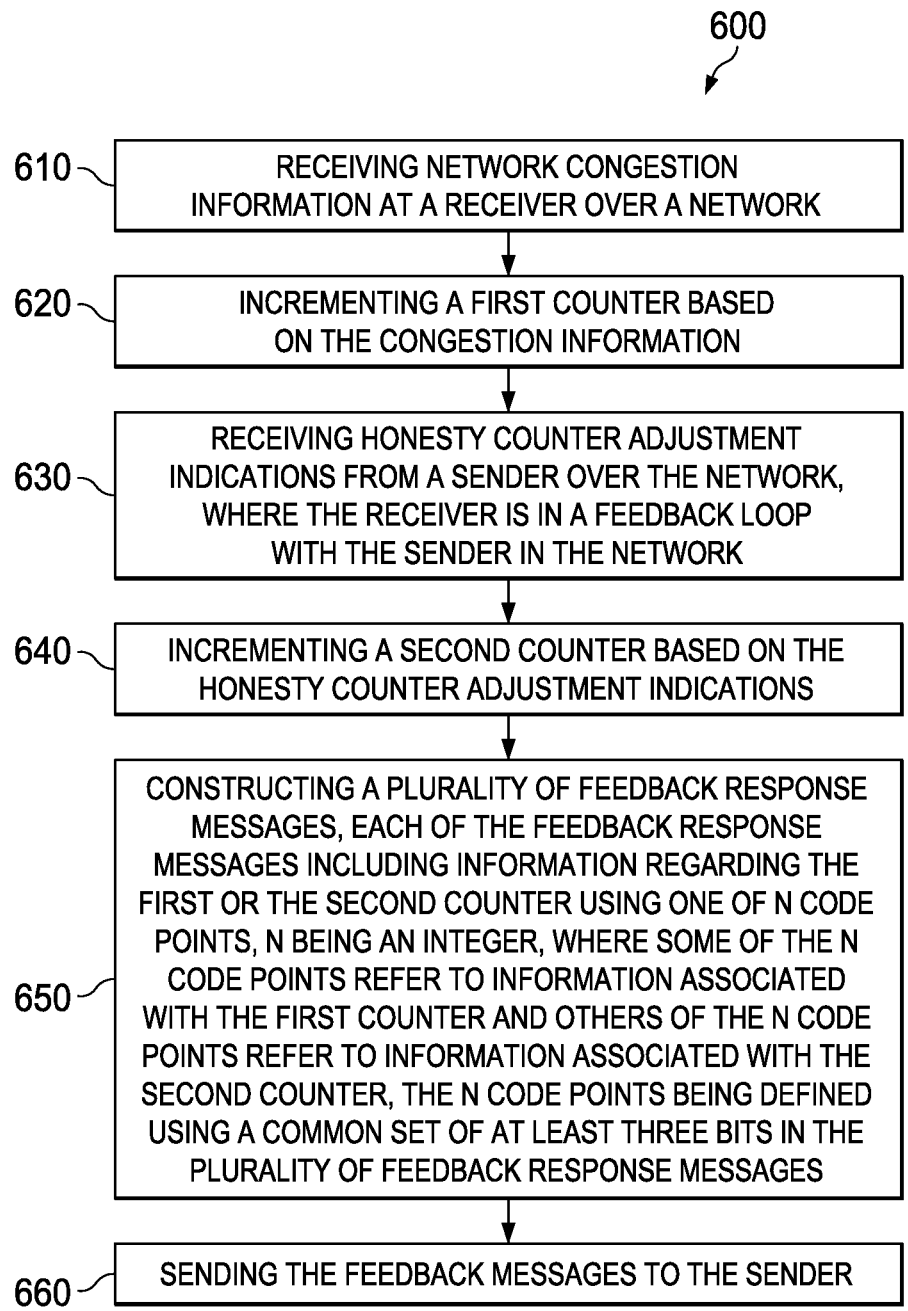
FIG. 6 is an illustration of an example process adapted according to one embodiment.

FIG. 6 is an illustration of an example process 600 adapted according to one embodiment. The process of FIG. 6 may be performed by, e.g., the receiver 120 of FIG. 1 to provide appropriate feedback to a sender.

At block 610, the receiver receives network congestion information over the network. In one example, the network congestion information includes a congestion marker placed in an IP packet by a network device, e.g., a router or switch. However, any appropriate network congestion information may be adapted for use in some embodiments.

Figure 8:
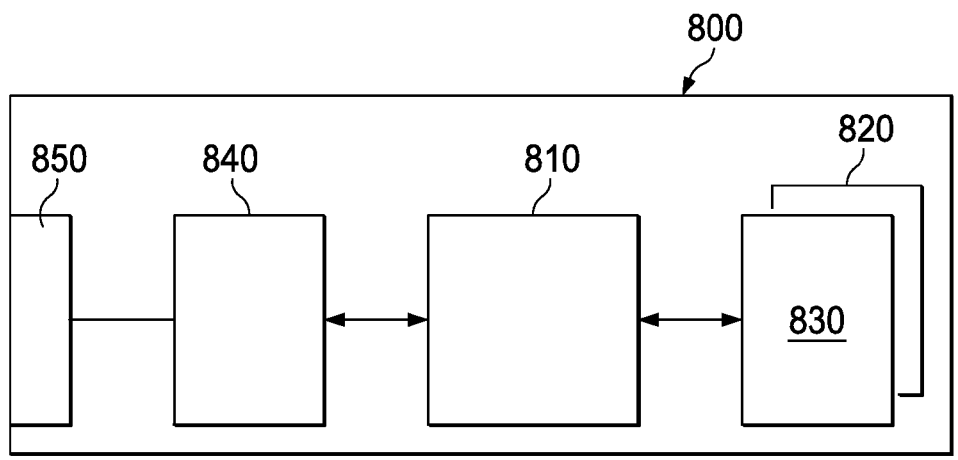
FIG. 8 is an illustration of an example device adapted according to one embodiment.

At block 620, the receiver increments a first counter based on the congestion information. Example counters 820, 830 are shown in FIG. 8. Any appropriate counter may be used in various embodiments, including, for instance, a traditional counter or a gauge.

At block 630, the receiver receives honesty counter adjustment indications. One example of honesty counter adjustment information includes an ECT(1) flag in an IP header, though the scope of embodiments is not limited thereto. Any appropriate counter adjustment indication may be adapted for use in process 600.

At block 640, the receiver increments a second counter based on the honesty counter adjustment of block 630. In one example, the counters of blocks 620 and 640 include counters that wrap after a specific number of value changes. For instance, the embodiments above mention a modulo 3 counter and a modulo 5 counter, though other embodiments may include different modulo divisors. Blocks 620 and 640 may include wrapping one or more of the counters after a maximum value has been reached.

At block 650, the receiver constructs feedback messages. In this embodiment, the receiver does not construct all of the feedback messages at the same time, but rather constructs them one at a time as shown in FIGS. 2-5. In this example, each of the feedback messages includes information regarding the first counter or the second counter. Each of the feedback messages includes one of N possible code points, where the N code points are defined using a common set of at least three bits. Each one of the code points refers to information associated with the first counter or information associated with the second counter, and each individual state of the counters is mapped to one of the code points.

An example is given above at Table 1, showing how three bits can be used to define eight total codepoints to map eight total states of the two counters. Thus, rather than having one bit represent a state of one counter and another bit representing a state of the other counter, the example embodiment uses all three bits in describing states of two separate counters. Further, each counter is represented by at least three code points, thereby providing a high level of information content.

At block 660, the receiver sends the feedback message to the sender. In one example, the receiver places the bits in a transport header in a TCP ACK packet. However, various embodiments may use any appropriate data structure to convey the feedback to the sender.

The scope of embodiments is not limited to the exact procedure shown in FIG. 6. For instance, some actions may be added, omitted, rearranged, or modified. In one example, the process 600 is repeated multiple times during a communication session to produce feedback messages. In many embodiments, the blocks follow an order of 610, 620, 650, and/or 630, 640, 650 so that the order of the blocks in FIG. 6 is for ease of illustration rather than for explicitly describing an order.

In one embodiment, the receiver sends at least two messages with a given congestion (or honesty) code point before switching to a different congestion (or honesty) codepoint, as illustrated above with respect to FIG. 4. In another embodiment, the receiver adjusts a sending rate of feedback in response to a determination that a difference between a counter and a previously-sent packet has reached a threshold, as illustrated above with respect to FIG. 5.

Figure 7:
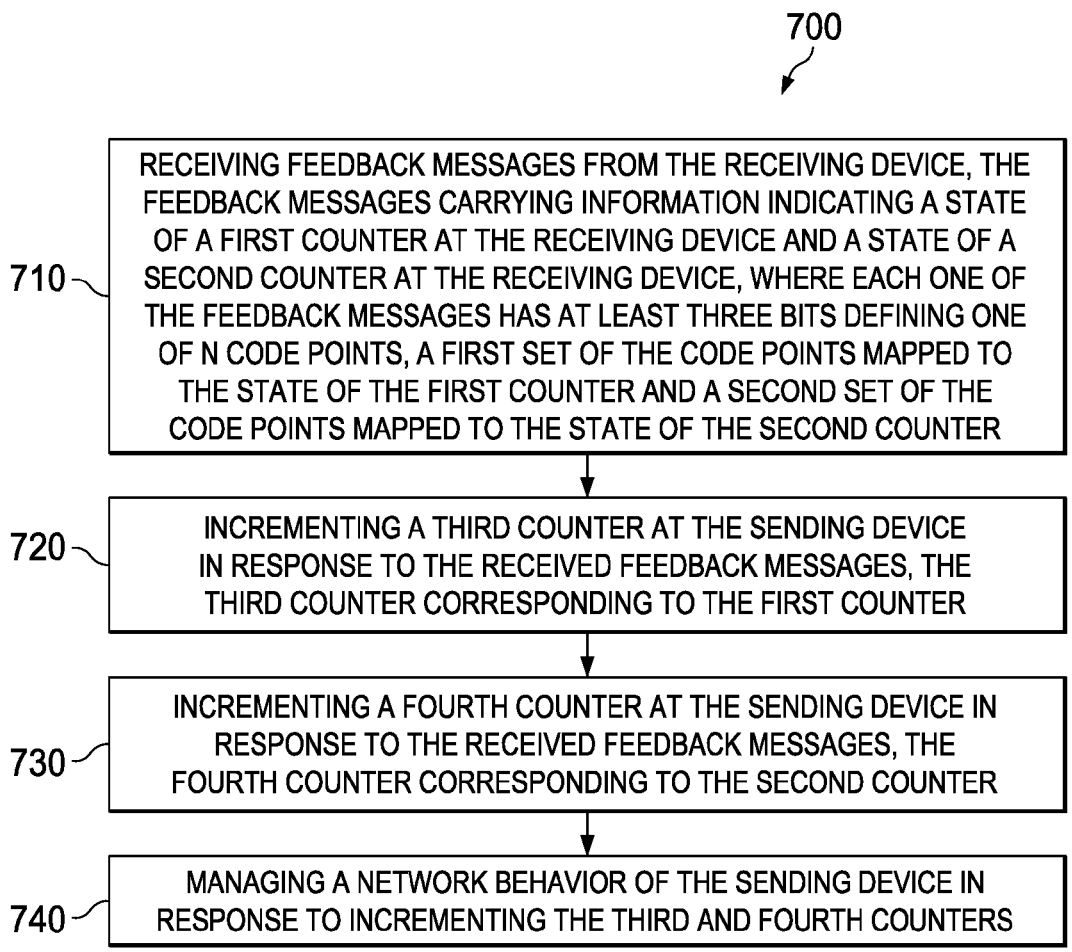
FIG. 7 is an illustration of an example process adapted according to one embodiment.

FIG. 7 is an illustration of an example process 700 adapted according to one embodiment. The process of FIG. 7 may be performed by, e.g., the sender 110 of FIG. 1 to react appropriately to feedback from a receiver.

In block 710, the sender receives feedback messages from the receiving device, where the feedback messages convey information indicating a state of a first counter at the receiving device and a state of a second counter at the receiving device. As in the example above, the first counter may reflect network congestion information, and the second counter may reflect an honesty accounting of the receiver. In this example embodiment, each feedback message indicates a state of the first counter or a state of the second counter, but not both.

Each one of the feedback messages has at least three bits defining one of N code points, a first set of the code points mapped to the state of the first counter and a second set of the code points mapped to the state of the second counter. This concept is explained further above at block 650.

At block 720, the sender increments a third counter in response to the received feedback messages. The third counter corresponds to the first counter—in this case by tracking information in the feedback that provides a state of the first counter.

At block 730, the sender increments a fourth counter in response to the received feedback messages. The fourth counter corresponds to the second counter—in this case by tracking information in the feedback that provides a state of the second counter.

At block 740, the sender manages its behavior in response to incrementing the third and fourth counters. In one example, the third counter conveys network congestion information. In response to discerning a high congestion state, the sender may adjust a bit rate of a communication session by, for example, decreasing the bit rate. In a scenario where the sender is supporting multiple communication sessions, the sender may decrease a bit rate of each of the sessions similarly, may adjust bit rates according to different priorities of the sessions, and/or the like.

In another example, the sender checks the fourth counter for an accounting of the honesty of the receiver. At any given time, a sum of the congestion counter and the honesty accounting counter at the sender should be equal to or greater than the number of honesty counter incrementing indications (e.g., ECT(1) messages) sent from the sender to the receiver. If the above-mentioned sum is not greater, it may be an indication that the receiver is suppressing congestion notifications in order to receive an unfair portion of network bandwidth. Accordingly, the sender may seek to enforce network policies in any appropriate manner. Examples of enforcement include reducing a bit rate of a communication with the receiver, resetting a communication session with the receiver, banning the receiver, and/or the like.

The scope of embodiments is not limited to the exact procedure shown in FIG. 7. For instance, some actions may be added, omitted, rearranged, or modified. In one example, the process 700 is repeated multiple times during a communication session so that network congestion is managed throughout the session.

Furthermore, the embodiments described above with respect to FIGS. 6 and 7 refer to honesty information (e.g., ECN Nonce information) and congestion information (e.g., CE information in ECN). However, the scope of embodiments encompasses systems and methods that track other relevant information using counters and feedback. In other words, the concept of conveying a multitude of counters using code points to save bits in a protocol header may have more widespread applicability outside of network congestion management and also outside of TCP/IP.

FIG. 8 is an illustration of an example device 800 according to one embodiment. In this example, device 800 may be a sender or a receiver. Device 800 includes port 850 for interfacing with the network. Transmission and receiving unit 840 is in communication with the port 850 for sending and receiving data over the network.

Processor 810 increments the counters 820, 830. For instance, in the case of a receiver, processor 810 increments counters 820, 830 in response to network congestion information and honesty accounting indications from the sender. In the case of a sender, processor 810 increments counters 820, 830 in response to the feedback from the receiver. Processor 810 may also form feedback messages (as in block 650 of FIG. 6) and/or change a network behavior (as in block 740 of FIG. 7).

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors (such as processor 810 of FIG. 8) running in one or more of devices (such as device 800) execute code to implement the actions shown in FIGS. 2-7.

Various embodiments may include one or more advantages over conventional systems. For instance, various embodiments convey both honesty accounting information and congestion information from a receiver to a sender without adding additional bits to the TCP transport header over than defined in ECN currently. Furthermore, the informational content provided by some embodiments in the feedback messages can be quite high by allocating three or more code points to each type of information. By contrast, some conventional techniques may provide only one bit of a particular type of information or, if providing multiple bits of a particular type of information, omitting other types of information.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium, the computer-readable medium comprising:
   code to receive, at a receiving device via a network, network congestion information;
   code to receive, at the receiving device from a sending device via the network, honesty accounting information, wherein the receiving device is in a feedback loop with the sending device;
   code to increment a first counter and a second counter based on the network congestion information and honesty accounting information, respectively;
   code to generate a plurality of feedback signals reflecting states of the first and second counters using a common set of at least three bits in the plurality of feedback signals, the common set of at least three bits defining a first set of code points mapped to -states of the first counter and a second set of code points mapped to states of the second counter such that each individual code point represents a different one of the states of the first or second counters and each one of the states of the first and second counters is represented by one code point; and
   code to transmit the plurality of feedback signals to the sending device in the network.

2. The computer-readable medium of claim 1 in which the code to transmit comprises:
   code to transmit each feedback signal at least twice.

3. The computer-readable medium of claim 1 in which the code to transmit comprises:
   code to increase a sending rate of the feedback signals in response to a determination that a difference between a value of the first or the second counter and a code point of a previously-sent feedback signal has reached a threshold.

4. A method comprising:
   receiving network congestion information at a receiver over a computer network;
   receiving honesty counter adjustment indications from a sender over the computer network, where the receiver is in a feedback loop with the sender in the computer network;
   incrementing a first counter based on the congestion information;
   incrementing a second counter based on the honesty counter adjustment indications;
   constructing a plurality of feedback messages, each of the feedback messages including information reflecting a state of the first or the second counter using one of N code points, N being an integer greater than one, where a first set of the N code points reflect states of the first counter and a second set of the N code points reflect states of the second counter, the N code points being defined using a common set of at least three bits in the plurality of feedback messages; and
   sending the feedback messages to the sender over the computer network.

5. The method of claim 4 in which a number of bits equals three and N equals eight, further in which five of the N code points are used for reflecting states of the first counter and three of the N code points are used for reflecting states of the second counter.

6. The method of claim 4 in which sending the feedback messages to the sender comprises:
   calculating a difference between a code point of a previously sent feedback message and one of the first or second counters; and
   adjusting a frequency of sending the feedback messages in response to the calculated difference.

7. The method of claim 4 in which sending the feedback messages to the sender comprises:
   sending a number P of feedback messages with a given code point before sending a subsequent feedback message with a different code point even if the first counter increments before the P feedback messages are sent, and where P is an integer larger than one.

8. The method of claim 4 in which each of the feedback messages comprises a Transmission Control Protocol (TCP) ACK packet.

9. The method of claim 4 in which the network congestion information is received from a network device other than the sender.

10. The method of claim 4 in which the first counter has a different modulo divisor than a modulo divisor of the second counter.

11. The method of claim 4 in which constructing a plurality of feedback messages comprises:
    assigning a priority to a first one or more of the N code points, referring to information associated with the first counter, over a second one or more of the N code points referring to information associated with the second counter.

12. The method of claim 4 in which the N code points are defined so that, for a given one of the feedback messages, the receiver sends either a code point for honesty accounting information or a code point for network congestion, but not both.

13. A receiver in a network environment comprises:
    at least one port for communicating over a computer network, in which the receiver is in a feedback loop with a sender over the computer network;
    a first counter;
    a second counter;
    a processor for:
        receiving network congestion information;
        incrementing the first counter based on the network congestion information;
        receiving, from the sender, honesty accounting information;
        incrementing the second counter based on the honesty accounting information; and
        forming feedback messages based on states of the first and second counters, further in which each of the feedback messages includes information reflecting a state of the first or the second counter using a common set of M bits in each of the feedback messages, the common set of M bits defining one of N different code points, where M and N are both integers larger than one, where a first set of the N code points reflects states of the first counter and where a second set of the N code points reflects states of the second counter; and
    a transmission unit for sending the feedback messages over the computer network to the sender.

14. The receiver of claim 13 in which the processor is configured to adjust a frequency of sending the feedback messages in response to a difference between a code point in a previously-sent feedback message and a value of the first counter.

15. The receiver of claim 13 in which the processor is configured to send a number P of feedback messages with a given code point before sending a subsequent feedback message with a different code point.

16. The receiver of claim 13 in which the first counter has a different modulo divisor than a modulo divisor of the second counter.

17. A method performed by a sending device in a feedback loop with a receiving device over a computer network, the method comprising:

receiving feedback messages from the receiving device, the feedback messages carrying information indicating a state of a first counter at the receiving device and a state of a second counter at the receiving device, where each one of the feedback messages has at least three bits defining one of N code points, a first set of the code points mapped to the state of the first counter and a second set of the code points mapped to the state of the second counter;

incrementing third and fourth counters at the sending device in response to the received feedback messages, the third and fourth counters corresponding to the first and second counters, respectively; and managing a network behavior of the sending device in response to incrementing the third and fourth counters.

18. The method of claim 17 in which the first and third counters reflect network congestion information, further in which managing a network behavior comprises adjusting a bit rate of a communication session in response to a state of the third counter.

19. The method of claim 17 in which the second and fourth counters reflect an honesty accounting of the receiving device, further in which managing a network behavior of the sending device comprises comparing a code point value for honesty information in a feedback packet with a sum of the fourth counter and a number of counter-incrementing messages sent by the sending device.

20. The method of claim 19 further comprising:

taking an enforcement action in response to determining that the sum of the fourth counter and a number of counter-incrementing messages sent by the sending device is not the same as, or greater than, the code point value for honesty information in the feedback packet.

* * * * *